2,783,230
Patented Feb. 26, 1957

2,783,230

DERIVATIVES OF META HYDROXY ANILINE

Moses Wolf Goldberg, Upper Montclair, and Albert Israel Rachlin, Hackensack, N. J., assignors to Hoffmann-La Roche Inc., Nutley, N. J., a corporation of New Jersey No Drawing. Application March 16, 1953,
Serial No. 342,737

12 Claims. (Cl. 260—247.2)

This invention relates to new derivatives of meta-hydroxy aniline, particularly to meta-hydrocarbonoxy anilides of aliphatic acids containing a quaternary benzyl ammonium group in the alpha position of the acyl radical. The new compounds can also be described as meta ethers of (phenylcarbamylalkyl)benzyl-ammonium salts. The compounds of the invention can be represented by the following general formula:

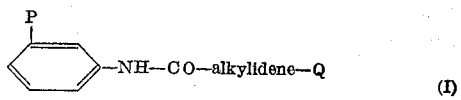
(I)

wherein P represents a hydrocarbonoxy group, e. g., lower alkanoxy, lower alkenoxy, and aralkanoxy, Q represents a fully substituted pentavalent nitrogen atom which is linked to an alkylidene radical, to a benzyl radical, and to an anion and in which the benzyl radical can be unsubstituted or substituted in the para position by an electronegative radical. For purposes of this invention the term alkylidene is intended to include any bivalent aliphatic radical having both free valences attached to the same carbon atom, e. g., methylene, ethylidene, isopropylidene, and the like.

More particularly, the invention relates to meta-hydroxy aniline derivatives represented by the formula:

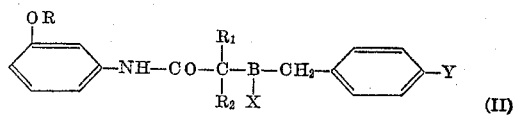
(II)

wherein R represents benzyl or an acyclic hydrocarbon radical, $R_1$ and $R_2$ represent hydrogen or an acyclic hydrocarbon radical, B represents a residue of a fully substituted ammonium radical, X represents an anion of a strong acid and Y represents hydrogen or an electronegative substituent.

The residue of a fully substituted ammonium radical represented by B in Formula II may be a di-lower alkyl amino radical as in Formula III below or the two lower alkyl radicals may join with the adjacent nitrogen atom to form an N-hetero radical such as piperidino or morpholino as in Formulae IV and V below. Compounds wherein B represents a di-lower alkyl-amino, piperidino, or morpholino radical in Formula II above constitute a preferred class.

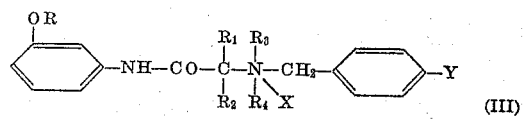
(III)

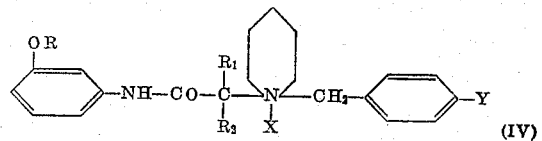
(IV)

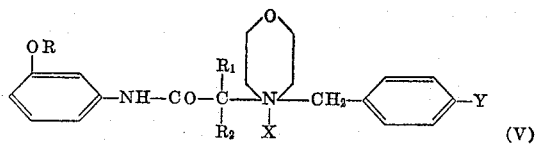
(V)

R, $R_1$, $R_2$, X and Y have the same significance as in Formula II above; $R_3$ and $R_4$ represent acyclic hydrocarbon radicals. The acyclic hydrocarbon radicals represented by R include lower alkyl radicals such as methyl, ethyl, propyl, and the like, or lower alkenyl radicals such as vinyl, allyl, butenyl and the like. The acyclic hydrocarbon radicals represented by $R_1$, $R_2$, $R_3$ and $R_4$ include methyl, ethyl, propyl, butyl, amyl and the like. Those lower alkyl groups represented by R, $R_1$, $R_2$, $R_3$ and $R_4$ may be the same or different from each other in the various positions.

The compounds of this invention are useful as therapeutic agents, more particularly as anthelmintic and antiprotozoal agents, as illustrated by their utility in combatting organisms of the families Oxyuridae and Coccidia.

In general, the novel compounds can be prepared according to the following procedure: A tertiary amine of the general formula

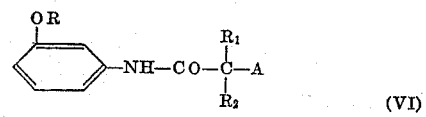
(VI)

wherein R, $R_1$, $R_2$ have the significance indicated previously and where A is a fully substituted trivalent nitrogen atom, is quaternized by either a benzyl or a p-substituted benzyl quaternizing agent. These quaternizing agents include esters of benzyl alcohol or of a p-substituted benzyl alcohol with a strong acid such as hydrochloric, hydrobromic, hydroiodic, benzene sulfonic acid, paratoluene sulfonic acid and the like. The p-substituent on the benzyl group of the quaternizing agent includes such electronegative radicals as Cl, $NO_2$, $CH_3CO$ and similar alkanoyl radicals, $CH_3SO_2$, etc. Furthermore, the anion present in the quaternary salts prepared according to the foregoing method can be replaced with another anion by passing the salt through an anion exchange resin according to known ion exchange processes.

Certain tertiary amines represented by Formula VI which are intermediates in the production of applicants' novel compounds are themselves new. They can be prepared in general by reacting a m-amino phenyl ether such as m-allyloxyaniline with an alpha-halogeno acyl halide such as bromacetyl bromide and chloracetyl chloride or with an alpha-halogenated acid anhydride such as chloracetic anhydride, and then condensing the resulting substituted anilide with a secondary amine such as diethylamine.

This invention includes within its scope the compounds in their anhydrous form and with various amounts of water of hydration.

The method of preparation of the compounds of this invention is illustrated by the following examples:

EXAMPLE 1

(m-Allyloxyphenylcarbamylmethyl) diethyl-(p-nitro-benzyl)ammonium bromide

To a solution of 139 g. of crude m-nitrophenol in 2 liters of ethanol were added 57 g. of sodium methoxide. The resulting slurry was stirred for 10 minutes, 139 g. of allyl bromide were added, and the mixture stirred and refluxed for 8 hours. One liter of solvent was distilled off, and the residue was cooled and filtered through a pad of diatomaceous earth. The filter cake was washed with benzene and the solvent was removed from the filtrate by vacuum distillation. The residue, crude m-allyloxynitrobenzene, was processed without purification.

A slurry of 300 g. of 40 mesh iron in two liters of water and 30 cc. of glacial acetic acid was stirred and refluxed for 30 minutes. The temperature was allowed to drop to 95° C., and the crude m-allyloxynitrobenzene, dissolved in 100 cc. of ethanol, was then added at such a rate that gentle refluxing was maintained without external heating. Twenty minutes were required for the addition. The reaction mixture was stirred and refluxed for 75 minutes. The temperature was allowed to drop to 85° C., and 150 g. of sodium carbonate were added, carefully at first. The temperature was then allowed to drop to 70° C., and 1 liter of benzene was added. After stirring for 5 minutes, the mixture was filtered through a pad of diatomaceous earth. The iron sludge was washed with 500 cc. of benzene and the filtrate was phase separated. The aqueous layer was extracted with 500 cc. of benzene, and the combined benzene solutions were concentrated by flash distillation. The residual oil was distilled in vacuo through a 6-inch Vigreaux column to give pure m-allyloxyaniline, B. P. 95–98° C./0.09mm.

To a stirred, ice-cold mixture of 99.5 g. of m-allyloxyaniline, 200 cc. of ether and 500 cc. of water containing a trace of phenolphthalein were added, simultaneously, a solution of 138 g. of bromoacetyl bromide in 250 cc. of ether and 345 cc. of 2 N sodium hydroxide solution. The time required for the addition of the reagents was forty minutes, and the relative rates of addition were controlled so that the reaction mixture was kept slightly alkaline, as indicated by a constant pink phenolphthalein color. The mixture was stirred for 30 minutes longer, the phenolphthalein color was discharged by the addition of a few drops of acetic acid, and the ether layer was separated. The aqueous phase was extracted with 150 cc. of ether and the ether extracts were combined and stored in a refrigerator for 20 hours. A crop of crystals was collected, M. P. 77–79° C. The filtrate was concentrated to 175 cc. and cooled in a refrigerator for 5 hours. A second crop of crystals, M. P. 77–79° C., was separated, the filtrate was concentrated to 75 cc. and stored in a refrigerator for 20 hours. A third crop of crystals having the same melting point was collected and combined with the crystals previously obtained. The analytical sample of α-bromo-m-allyloxyacetanilide, recrystallized three times from methanol, melted at 78–80° C.

A mixture of 6 g. of α-bromo-m-allyloxyacetanilide, 60 cc. of ethanol, 10 cc. of diethylamine and 3 g. of potassium carbonate was heated in a sealed tube at 85° C. for 20 hours. The solvent was distilled off in vacuo and the residue was partitioned between a mixture of 125 cc. of ether, 100 cc. of water, and 15 cc. of 4 N sodium hydroxide solution. The ether solution was dried over magnesium sulfate and concentrated in vacuo. The residue comprised crude m-allyloxyphenylcarbamylmethyl diethylamine.

The crude m-allyloxyphenylcarbamylmethyl diethylamine was dissolved in 60 cc. of acetone, 5.2 g. of p-nitrobenzyl bromide were added, and the solution was refluxed for 24 hours. The solvent was then removed in vacuo and the solid residue recrystallized from 100 cc. of ethanol. The white crystalline product melted at 164–166° C. The (m-allyoxyphenylcarbamylmethyl)diethyl-(p-nitrobenzyl)ammonium bromide obtained was analytically pure.

EXAMPLE 2

*(m-Allyloxyphenylcarbamylmethyl)diethyl-(p-chlorobenzyl)ammonium chloride*

Crude m-allyloxyphenylcarbamylmethyl diethylamine, prepared in the same manner as in Example 1, was dissolved in 50 cc. of acetone, 5.4 g. of p-chlorobenzyl chloride were added, and the solution was refluxed for 24 hours. The solution was concentrated to a volume of 35 cc., ether was added to slight turbidity and, after standing for several hours in a refrigerator, a crystalline product, M. P. 109–112° C., was formed. By removing the solvent from the mother liquor and repeating the crystallization procedure, a second crop of product, M. P. 109–112° C., was obtained. The crude material was recrystallized from a mixture of 40 cc. of acetone and 40 cc. of ether, giving as a product analytically pure (m-allyloxyphenylcarbamylmethyl)diethyl(p-chlorobenzyl) ammonium chloride, M. P. 117–118° C. (with decomposition).

EXAMPLE 3

*(m-Allyloxyphenylcarbamylmethyl)diethyl-(p-acetylbenzyl)ammonium bromide*

Crude m-allyloxyphenylcarbamylmethyl diethylamine, prepared according to the procedure described in Example 1, was dissolved in 50 cc. of acetone, 6.3 g. of p-acetylbenzylbromide were added and the solution was refluxed for 20 hours. The solvent was removed in vacuo and the oily residue was dissolved in 35 cc. of warm ethanol. Ether was added to slight turbidity and, after standing for several hours in a refrigerator, a crystalline product formed. Recrystallized three times from alcohol and ether, the analytical sample of (m-allyloxyphenylcarbamylmethyl)diethyl(p-acetylbenzyl)ammonium bromide melted at 131–133° C. (with decomposition).

EXAMPLE 4

*(m-Allyloxyphenylcarbamylmethyl)diethyl-benzylammonium bromide*

Crude m-allyloxyphenylcarbamylmethyl diethylamine, as prepared in Example 1, was dissolved in 50 cc. of acetone, 3.66 g. of benzyl bromide were added, and the solution was refluxed for 24 hours. The solvent was removed in vacuo and the oily residue was dissolved in 25 cc. of methyl ethyl ketone, treated with activated charcoal, and the filtrate was made turbid by addition of 30 cc. of ether. On standing in a cool place for several hours, a crystalline product, M. P. 104–107° C., was formed. This material was recrystallized from a mixture of 17 cc. of methyl ethyl ketone and 15 cc. of ether, giving pure (m-allyloxyphenylcarbamylmethyl)diethylbenzylammonium bromide, M. P. 108–110° C.

EXAMPLE 5

*(m-Allyloxyphenylcarbamylmethyl)dipropyl-benzylammonium bromide*

To a stirred, ice-cold mixture of 194 g. of m-allyloxyaniline, as prepared in Example 1, 300 cc. of ether and 1000 cc. of water containing a trace of phenolphthalein were added, simultaneously, a solution of 147.2 g. of chloroacetyl chloride in 300 cc. of ether and 654 cc. of 2 N sodium hydroxide solution. The time required for the addition of the reagents was thirty minutes, and the relative rates of addition were controlled so that the reaction mixture was kept slightly alkaline, as indicated by a constant pink phenolphthalein color. The mixture was stirred thirty minutes longer during which time the product separated as a mass of white crystals. The solid was filtered, washed with 500 cc. of water and dried superficially. The still damp product was recrystallized from a mixture of 660 cc. of ethanol and 220 cc. of water. The α-chloro-m-allyloxyacetanilide produced melted at 90–92° C.

A mixture of 200 g. of α-chloro-m-allyloxyacetanilide, 1000 cc. of ethanol, 150 g. of di-n-propylamine and 60 g. of potassium carbonate was stirred and refluxed for 22 hours. The solvent was distilled in vacuo and the residue was partitioned between a mixture of 500 cc. of water, 80 cc. of 4 N sodium hydroxide and 400 cc. of ether. The ether solution was dried over magnesium sulfate and concentrated in vacuo. The residue was crude (m-allyloxyphenylcarbamylmethyl)dipropylamine.

A solution of 11.75 g. of (m-allyloxyphenylcarbamylmethyl)dipropylamine and 7 g. of benzyl bromide in 50 cc. of acetone was refluxed for 40 hours. The solvent was evaporated in vacuo and the residue, after first being triturated with ether, was crystallized from a mixture of 60 cc. of methyl ethyl ketone and 50 cc. of ether. Upon recrystallization three times from a mixture of methyl ethyl ketone and ether, (m-allyloxyphenylcarbamylmethyl)dipropylbenzylammonium bromide hemihydrate was obtained melting at 103–105° C.

EXAMPLE 6

*4 -(m-Allyloxyphenylcarbamylmethyl)-4-(4-nitrobenzyl)-morpholinium bromide*

A mixture of 6 g. of α-bromo-m-allyloxyacetanilide, prepared according to the procedure described in Example 1, 60 cc. of ethanol, 10 cc. of morpholine and 3 g. of potassium carbonate was heated in a sealed tube at 85° C. for twenty hours. The solvent was removed in vacuo and the residue was partitioned between a mixture of 125 cc. of ether, 100 cc. of water and 15 cc. of 4 N sodium hydroxide solution. The ether solution was dried over magnesium sulfate and concentrated in vacuo. A residue, comprising crude m-allyloxyphenylcarbamylmethyl morpholine, was obtained.

The crude m-allyloxyphenylcarbamylmethyl morpholine was dissolved in 50 cc. of acetone, 4.7 g. of p-nitrobenzyl bromide were added and the solution was refluxed for 24 hours. The solvent was removed in vacuo and the solid residue was recrystallized from a mixture of 155 cc. of ethanol and 3 cc. of water. The white crystalline product, 4-(m-allyloxyphenylcarbamylmethyl)-4-(4 - nitrobenzyl)-morpholinium bromide, melted at 127–130° C. (with decomposition). Recrystallized three times from aqueous alcohol, the analytical sample melted at 130–131° C. (with decomposition).

EXAMPLE 7

*1 - (m - allyloxyphenylcarbamylmethyl) - 1 - (4 - nitrobenzyl)piperidinium bromide*

By a method corresponding to that followed in Example 6 employing piperidine instead of morpholine in the preparation of the tertiary amine intermediate, 1-(m-allyloxyphenylcarbamylmethyl) - 1 - (4-nitrobenzyl)piperidinium bromide, M. P. 115–116° C., was obtained.

EXAMPLE 8

*(m - Allyloxyphenylcarbamylmethyl)dimethyl(p - nitrobenzyl)ammonium bromide*

Crude (m - allyloxyphenylcarbamylmethyl)dimethylamine was prepared by reacting α-bromo-m-allyloxyacetanilide with dimethylamine according to the procedure described in Example 1. The crude (m-allyloxyphenyl carbamylmethyl) dimethylamine was dissolved in 50 cc. of acetone, 4.8 g. of p-nitrobenzyl bromide were added, and the solution was refluxed for 60 hours. The reaction mixture was cooled to 25° C. and ether was added until the solution became turbid. On standing at room temperature for sixteen hours, the product separated as a white crystalline mass. The (m - allyloxyphenylcarbamylmethyl)dimethyl(p-nitrobenzyl)ammonium bromide was crystallized three times from a mixture of acetone and ether, M. P. 146–148° C.

EXAMPLE 9

*[α-(m-Allyloxyphenylcarbamyl)ethyl]diethyl(p-nitrobenzyl)ammonium bromide*

To a stirred, ice-cold mixture of 23.9 g. of m-allyloxyaniline, prepared as in Example 1, 75 cc. of ether and 150 cc. of water containing a trace of phenolphthalein were added, simultaneously, a solution of 27.3 g. of α-bromopropionyl chloride in 100 cc. of ether and 80 cc. of 2 N sodium hydroxide solution. The time required for the addition of the reagents was 20 minutes, and the relative rates of addition were controlled so that the reaction mixture was kept slightly alkaline as indicated by a constant pink phenolphthalein color. The mixture was stirred 30 minutes longer, the phenolphthalein color was discharged by the addition of a few drops of acetic acid, and the ether layer was separated. The aqueous layer was extracted with 100 cc. of ether, and the combined ether extracts were dried over magnesium sulfate. The drying agent was removed by filtration, and the clear filtrate was made slightly turbid by the addition of 100 cc. of petroleum ether. After cooling in a refrigerator for several hours, α-bromo-m-allyloxypropionanilide separated as a white crystalline mass. The product, recrystallized three times from ether-petroleum ether, melted at 78–79° C.

A mixture of 11.35 g. of α-bromo-m-allyloxypropionanilide, 50 cc. of ethanol, 10 cc. of diethylamine and 4.5 g. of potassium carbonate was heated in a sealed tube at 90° C. for 20 hours. The solvent was removed in vacuo and the residue was partitioned between a mixture of 125 cc. of ether, 100 cc. of water and 15 cc. of 4 N sodium hydroxide solution. The ether solution was dried over magnesium sulfate and concentrated in vacuo. A residue comprising crude [α-(m-allyloxyphenylcarbamyl)ethyl]diethylamine was obtained.

The crude [α - (m-allyloxyphenylcarbamyl)ethyl]diethylamine was dissolved in 50 cc. of acetone, 7.6 g. of p-nitrobenzyl bromide were added, and the solution was refluxed for 54 hours. The solvent was removed in vacuo and the residue was triturated with two 100 cc. portions of ether to remove unreacted starting materials. The ether-insoluble portion was dissolved in 40 cc. of hot ethanol, treated with activated charcoal, and the filtrate was made turbid by the addition of 75 cc. of ether. On standing in a cool place for several hours, a crystalline product separated. [α-(m-Allyloxyphenylcarbamyl)ethyl]diethyl(p-nitrobenzyl)ammonium bromide, melting at 132–134° C., was obtained upon recrystallization four times from a mixture of alcohol and ether.

EXAMPLE 10

*[1-(m-allyloxyphenylcarbamyl)isopropyl]diethyl(p-nitrobenzyl)ammonium bromide*

α-Bromo-m-allyloxyisobutyranilide was prepared from m-allyloxyaniline and α-bromoisobutyryl chloride in a manner analogous to the procedure followed in Example 9. The analytical sample, recrystallized three times from 70 percent ethanol, melted at 57–58° C. This product was converted to the tertiary amine[1-(m-allyloxyphenylcarbamyl)isopropyl]diethylamine by reaction with diethylamine as in the preceding example.

The crude tertiary amine was dissolved in 50 cc. of acetone, 3.35 g. of p-nitrobenzyl bromide were added, and the solution was refluxed for 70 hours. The solvent was removed in vacuo and the residue was triturated with two 100 cc. portions of ether. The semi-solid ether-insoluble mass was dissolved in 40 cc. of warm dilute alcohol, treated with activated charcoal, and the filtrate was made turbid by the addition of 75 cc. of ether. On standing in a cool place, an almost white crystalline product, [1 - (m - allyloxyphenylcarbamyl)isopropyl]diethyl(p-nitrobenzyl)ammonium bromide hemihydrate, separated, M. P. 176–178° C. The product was recrystallized three times from a mixture of dilute alcohol and ether.

EXAMPLE 11

*(m-Isopropoxyphenylcarbamylmethyl)diethyl(p-nitrobenzyl)ammonium bromide*

To a stirred, ice-cold mixture of 31 g. of m-aminophenyl isopropyl ether, 100 cc. of ether and 300 cc. of water containing a trace of phenolphthalein were added, simultaneously, a solution of 25.4 g. of chloroacetyl chloride in 100 cc. of ether and 113 cc. of 2 N sodium hydroxide solution. The time required for the addition of the reagents was 15 minutes, and the relative rates of addition were controlled so that the reaction mixture was kept slightly alkaline as indicated by a constant pink phenolphthalein color. The mixture was stirred 30 minutes longer and the solid product was filtered, washed with water and air dried. The crude α-chloro-m-isopropoxyacetanilide was recrystallized several times from 80 percent ethanol, M. P. 116–118° C.

A mixture of 6 g. of α-chloro-m-isopropoxyacetanilide, 50 cc. of ethanol, 10 cc. of diethylamine and 3 g. of potassium carbonate was heated in a sealed tube at 85° C. for 20 hours. The solvent was removed in vacuo and the residue was partitioned between a mixture of 125 cc. of ether, 100 cc. of water and 15 cc. of 4 N sodium hydroxide solution. The ether solution was dried over magnesium sulfate and concentrated in vacuo. The residue, crude (m-isopropoxyphenylcarbamylmethyl)diethylamine, was dissolved in 50 cc. of acetone, 4.9 g. of p-nitrobenzyl bromide were added, and the solution was refluxed for 20 hours. The solvent was removed in vacuo, and the oily residue solidified after trituration with 100 cc. of ether. The (m-isopropoxyphenylcarbamylmethyl)diethyl(p-nitrobenzyl)ammonium bromide, recrystallized from 40 cc. of ethanol, melted at 158–160° C.

EXAMPLE 12

*(m-Butoxyphenylcarbamylmethyl)diethyl(p-nitrobenzyl)ammonium bromide*

(m - Butoxyphenylcarbamylmethyl)diethyl(p - nitrobenzyl)ammonium bromide, M. P. 166–167° C., was prepared by starting with m-aminophenyl-n-butyl ether and proceeding according to the method described in Example 11. The intermediate, α-chloro-m-butoxyacetanilide, melted at 84–86° C.

EXAMPLE 13

*(m-Propoxyphenylcarbamylmethyl)diethyl(p-nitrobenzyl)ammonium bromide*

α-Bromo-m-propoxyacetanilide, M. P. 91–93° C., was prepared by reacting m-propoxyaniline with bromoacetyl bromide according to the procedure followed in Example 11. A mixture of 10 g. of α-bromo-m-propoxyacetanilide, 50 cc. of ethanol, 10 cc. of diethylamine and 4.5 g. of potassium carbonate was heated in a sealed tube at 85° C. for 20 hours. The solvent was removed in vacuo and the residue was partitioned between a mixture of 125 cc. of ether, 15 cc. of 4 N sodium hydroxide solution and 100 cc. of water. The ether solution was dried over magnesium sulfate and concentrated in vacuo. The residue comprised crude (m-propoxyphenylcarbamylmethyl)diethylamine.

The crude (m-propoxyphenylcarbamylmethyl)diethylamine was dissolved in 50 cc. of acetone, 7.5 g. of p-nitrobenzyl bromide were added, and the solution was refluxed for 20 hours. The solvent was removed in vacuo, and the solid residue was triturated with 250 cc. of ether. The ether-insoluble material was recrystallized from 150 cc. of ethanol. The (m-propoxyphenylcarbamylmethyl)diethyl(p-nitrobenzyl)ammonium bromide melted at 156–157° C. (with decomposition).

EXAMPLE 14

*(m-Ethoxyphenylcarbamylmethyl)diethyl(p-nitrobenzyl)ammonium bromide*

(m - Ethoxyphenylcarbamylmethyl)diethyl(p - nitrobenzyl)ammonium bromide, M. P. 169–170° C., was prepared from α-chloro-m-ethoxyacetanilide according to the procedure described in Example 13.

EXAMPLE 15

*(m-Methoxyphenylcarbamylmethyl)diethyl(p-nitrobenzyl)ammonium bromide*

(m - Methoxyphenylcarbamylmethyl)diethyl(p - nitrobenzyl)ammonium bromide, M. P. 168–169° C., was prepared from α-chloro-m-methoxyacetanilide according to the procedure described in Example 13.

EXAMPLE 16

*(m-Propoxyphenylcarbamylmethyl)dipropyl(p-nitrobenzyl)ammonium bromide*

(m - Propoxyphenylcarbamylmethyl)dipropyl(p - nitrobenzyl)ammonium bromide, M. P. 146–147° C., was prepared by reacting α-bromo-m-propoxyacetanilide with dipropylamine and quaternizing the product of that reaction according to the procedure described in Example 13.

EXAMPLE 17

*(m-Benzyloxyphenylcarbamylmethyl)dipropyl(p-nitrobenzyl)ammonium bromide*

To a stirred, ice-cold mixture of 25.7 g. of m-aminophenylbenzyl ether, 250 cc. of ether and 200 cc. of water, containing a trace of phenolphthalein, were added, simultaneously, a solution of 22 g. of chloroacetyl chloride in 100 cc. of ether and 90 cc. of 2 N sodium hydroxide solution. The time required for the addition of the reagents was 15 minutes, and the relative rates of addition were controlled so that the reaction mixture was kept slightly alkaline, as indicated by a constant pink phenolphthalein color. The mixture was stirred two hours longer, and a mass of white solid separated. The solid, α-chloro-m-benzyloxyacetanilide, was filtered, air dried, and recrystallized several times from methanol, M. P. 122–123° C.

A mixture of 5.8 g. of α-chloro-m-benzyloxyacetanilide, 75 cc. of alcohol, 10 cc. of di-n-propylamine and 14 g. of potassium carbonate was stirred and refluxed for 24 hours. The alcohol was removed in vacuo and the residue was partitioned between 75 cc. of ether, 75 cc. of water, and 15 cc. of 4 N sodium hydroxide solution. The ether extract, after being dried over magnesium sulfate, was evaporated to give crude, oily (m-benzyloxyphenylcarbamylmethyl)dipropylamine.

The crude amine was dissolved in 50 cc. of acetone, 4.5 g. of p-nitrobenzyl bromide were added, and the solution was refluxed for 24 hours. The solvent was removed in vacuo and the oily residue solidified after being triturated with ether. Recrystallized from 200 cc. of acetone and 10 cc. of water, the (m-benzyloxyphenylcarbamylmethyl)dipropyl(p-nitrobenzyl)ammonium bromide melted at 164–166° C.

EXAMPLE 18

*(m-Benzyloxyphenylcarbamylmethyl)dipropyl(p-chlorobenzyl)ammonium bromide*

A solution of 9.46 g. of (m-benzyloxyphenylcarbamylmethyl)dipropylamine, prepared as in the preceding example, and 6.17 g. of p-chlorobenzyl bromide in 50 cc. of acetone was refluxed for 24 hours. The solvent was removed in vacuo and the amorphous residue was crystallized from moist acetone. Recrystallized four times from moist acetone, the product, (m-benzyloxyphenylcarbamylmethyl)dipropyl(p - chlorobenzyl)ammonium bromide monohydrate, melted at 96–100° C. (with decompositilon).

EXAMPLE 19

*(m-Propoxyphenylcarbamylmethyl)dipropyl(p-chlorobenzyl)ammonium bromide*

A solution of 4 g. of (m-propoxyphenylcarbamylmethyl)dipropylamine, prepared according to the procedure described in Examples 13 and 16, and 3.1 g. of p-chlorobenzyl bromide in 40 cc. of acetone was refluxed for 24 hours. The solvent was removed in vacuo. The residual oil solidified after being triturated with ether. Recrystallized three times from moist acetone, the (m - propoxyphenylcarbamylmethyl)dipropyl(p - chlorobenzyl)ammonium bromide hemihydrate melted at 105–107° C. (with decomposition).

EXAMPLE 20

*4-(m-propoxyphenylcarbamylmethyl)-4-(4-nitrobenzyl)morpholinium bromide*

A mixture of 9.2 g. of α-bromo-m-propoxyacetanilide, prepared as described in Example 13, 50 cc. of ethanol, 9 cc. of morpholine and 3 g. of potassium carbonate was heated in a sealed tube at 85° C. for 20 hours. The solvent was removed in vacuo and the residue was partitioned between a mixture of 125 cc. of ether, 100 cc. of water and 15 cc. of 4 N sodium hydroxide solution. The ether solution was dried over magnesium sulfate and concentrated in vacuo. The residue, crude, solid 1 - (m - propoxyphenylcarbamylmethyl)morpholine, was dissolved in 50 cc. of acetone, 7.3 g. of p-nitrobenzyl bromide were added, and the solution was refluxed for 20 hours. The solvent was removed in vacuo and the solid residue was crystallized from a mixture of 350 cc. of ethanol, 15 cc. of water and 300 cc. of ether. The 4-(m-propoxyphenylcarbamylmethyl) - 4 - (4 - nitrobenzyl)-morpholinium bromide was analytically pure and melted at 168–169° C.

EXAMPLE 21

*1-(m-propoxyphenylcarbamylmethyl) - 1 - (4 - nitrobenzyl)piperidinium bromide*

A mixture of 9.2 g. of α-bromo-m-propoxyacetanilide, prepared as described in Example 13, 50 cc. of ethanol, 10 cc. of piperidine and 3 g. of potassium carbonate was heated in a sealed tube at 85° C. for 20 hours. The solvent was removed in vacuo and the residue was partitioned between a mixture of 125 cc. of ether, 100 cc. of water and 15 cc. of 4 N sodium hydroxide solution. The ether phase was dried over magnesium sulfate and concentrated in vacuo. The residue comprised crude 1-(m-propoxyphenylcarbamylmethyl) piperidine.

The crude piperidine derivative was dissolved in 50 cc. of acetone, 8.3 g. of p-nitrobenzyl bromide were added, and the solution was refluxed for 20 hours. The solvent was removed in vacuo and the solid residue was triturated with ether. The ether-insoluble product, recrystallized from a mixture of 250 cc. of ethanol, 8 cc. of water and 250 cc. of ether, was 1-(m-propoxyphenylcarbamyl-methyl) - 1 - (4 - nitrobenzyl)piperidinium bromide and melted at 191–193° C. Upon recrystallization three times from dilute alcohol, the product melted at 192–194° C.

EXAMPLE 22

*(m - Allyloxyphenylcarbamylmethyl)dipropyl(p - nitro - benzyl)ammonium bromide*

A mixture of 6 g. of α-bromo-m-allyloxyacetanilide, prepared according to the method described in Example 1, 50 cc. of ethanol, 6.5 cc. of di-n-propylamine and 3 g. of potassium carbonate was heated in a sealed tube at 85° C. for 20 hours. The solvent was removed in vacuo and the residue was partitioned between a mixture of 125 cc. of ether, 100 cc. of water and 15 cc. of 4 N sodium hydroxide solution. The ether solution was dried over magnesium sulfate and concentrated in vacuo. The residue comprised crude (m-allyloxyphenylcarbamyl-methyl)dipropylamine.

The crude dipropylamine compound derived above was dissolved in 50 cc. of acetone, 4.9 g. of p-nitrobenzyl bromide were added, and the solution was refluxed for 60 hours. The solvent was removed in vacuo and the white solid residue was triturated with 75 cc. of ether. The ether insoluble material was crystallized from a mixture of 80 cc. of acetone, 55 cc. of ethanol and 500 cc. of ether. Further recrystallization from a mixture of acetone, alcohol and ether yielded the product, (m-allyloxyphenylcarbamylmethyl)dipropyl(p - nitrobenzyl) - ammonium bromide, which melted at 148–150° C.

EXAMPLE 23

*(m-Allyloxyphenylcarbamylmethyl)dipropyl-(p-chlorobenzyl)ammonium bromide*

A mixture of 200 g. of α-chloro-m-allyloxyacetanilide, prepared as described in Example 5, 1000 cc. of ethanol, 150 g. of di-n-propylamine and 60 g. of potassium carbonate was stirred and refluxed for 22 hours. The solvent was distilled in vacuo and the residue was partitioned between a mixture of 500 cc. of water, 80 cc. of 4 N sodium hydroxide, and 400 cc. of ether. The ether solution was dried over magnesium sulfate and concentrated in vacuo. The residue comprised crude (m-allyloxyphenylcarbamyl-methyl)dipropylamine.

The crude (m-allyloxyphenylcarbamylmethyl)dipropyl-amine was dissolved in 480 cc. of acetone, 165 g. of p-chlorobenzyl bromide were added, and the solution was refluxed for 24 hours. The solvent was removed in vacuo and the residual oil solidified after being triturated with ether. The (m-allyloxyphenylcarbamylmethyl)-dipropyl(p-chlorobenzyl)ammonium bromide upon recrystallization twice from pure acetone melted at 125–127° C.

When two g. of the material thus obtained were recrystallized twice from 10 cc. of acetone containing 4 drops of water and 10 cc. of ether, the resulting crystals melted at 97–101° C. (with decomposition), the melting point of the monohydrate obtained below.

When the following procedure was used, the compound analyzed as a monohydrate and melted at 97–101° C. (with decomposition). A solution of 5.4 g. of (m-allyloxyphenylcarbamylmethyl)dipropylamine and 4.22 g. of p-chlorobenzyl bromide in 50 cc. of acetone was refluxed for 24 hours. The solvent was removed in vacuo. The residual oil solidified after being triturated with ether. The (m - allyloxyphenylcarbamylmethyl)dipropyl(p - chlorobenzyl) ammonium bromide monohydrate was recrystallized from a mixture of moist acetone and ether.

EXAMPLE 24

*(m-Allyloxyphenylcarbamylmethyl)dipropyl-(p-chlorobenzyl)ammonium iodide*

A solution of 5.8 g. of (m-allyloxyphenylcarbamyl-methyl)dipropylamine, prepared as described in the preceding example, 3.22 g. of p-chlorobenzyl chloride and 3 g. of sodium iodide in 50 cc. of acetone was refluxed for 18 hours. The sodium chloride formed in the reaction was filtered off and the mother liquor was evaporated in vacuo. The residual oil solidified after being triturated several times with ether. Recrystallized from a mixture of 35 cc. of acetone and 50 cc. of ether, the crude product melted at 115–117° C. Upon further recrystallization three times from a mixture of acetone and ether the (m-allyloxyphenylcarbamylmethyl)dipropyl(p - chloroben - zyl)ammonium iodide melted at 117–119° C.

EXAMPLE 25

*(m-Allyloxyphenylcarbamylmethyl)dipropyl-(p-chlorobenzyl)ammonium chloride*

A solution of 5.8 g. of (m-allyloxyphenylcarbamyl-methyl)dipropylamine, prepared according to the procedure described in Example 23, 3.22 g. of p-chlorobenzyl chloride, and 0.1 g. (catalytic amount) of sodium iodide in 50 cc. of acetone was refluxed for ten days. The reaction mixture was clarified by filtration and the mother liquor was evaporated in vacuo. The residual oil crystallized after being triturated twice with 125 cc. of ether. The (m-allyloxyphenylcarbamylmethyl)dipropyl(p-chlo-robenzyl)ammonium chloride monohydrate, recrystallized three times from a mixture of acetone and ether, melted at 94–97° C. (with decomposition).

The same product was prepared by ion exchange from the corresponding bromide which was produced in the maner described in Example 23. A bed of 75 g. of resinified organic base anion exchange resin (height 16 inches, diameter ¾ inches) was prepared by washing successively with 2 N sodium hydroxide solution, water, 2 N hydrochloric acid, water (until a negative chloride reaction was obtained from the effluent) and finally 50% aqueous acetone. A solution of 6 g. of (m-allyloxyphenylcarbamylmethyl)dipropyl(p - chlorobenzyl)ammonium bromide in a mixture of 90 cc. of acetone and 90 cc. of water was passed through the bed of resin. The column was flushed with 50% aqueous acetone until a negative chloride test was obtained and the combined effluents were evaporated in vacuo. The chloride product melted at 93–96° C. (with decomposition).

The same chloride was also prepared by ion exchange from the corresponding iodide produced in Example 24. The column used in the preceding experiment was regenerated with 2 N sodium hydroxide solution and prepared for operation in the usual manner. A solution of 6 g. of (m-allyloxyphenylcarbamylmethyl)dipropyl(p-chlorobenzyl)ammonium iodide in a mixture of 90 cc. of acetone and 90 cc. of water was passed through the bed of resin. The column was flushed with 50% aqueous acetone until a negative chloride test was obtained and the combined effluents were evaporated in vacuo. The chloride obtained melted at 93–96° C. (with decomposition).

We claim:

1. A compound of the formula

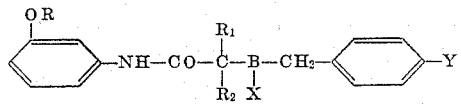

wherein R represents a member of the group consisting of lower alkyl, lower alkenyl and benzyl radicals, $R_1$ and $R_2$ represent a member of the group consisting of hydrogen and lower alkyl radicals, B represents a member of the group consisting of di-lower alkyl-amino, 1-piperidino and 4-morpholino radicals, X represents an anion of a strong acid, and Y represents a member of the group consisting of hydrogen, halogen, nitro, methylsulfonyl and lower alkanoyl radicals.

2. A compound of the formula

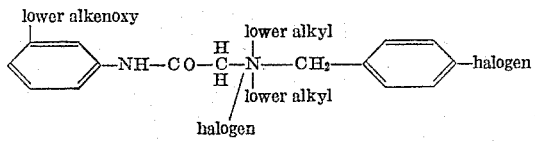

3. A compound of the formula

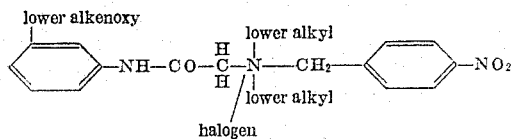

4. A compound of the formula

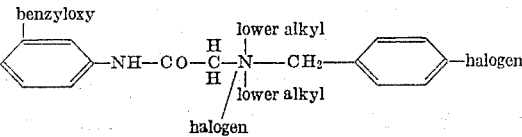

5. A compound of the formula

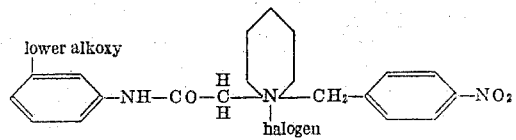

6. A compound of the formula

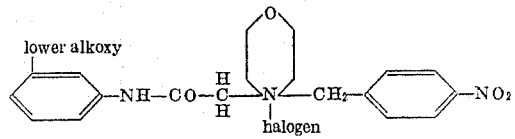

7. (m-Allyloxyphenylcarbamylmethyl)di-loweralkyl(p-halobenzyl) ammonium halides.

8. (m-Allyloxyphenylcarbamylmethyl)dipropyl(p-chlorobenzyl)ammonium chloride.

9. (m-Allyloxyphenylcarbamylmethyl)dipropyl(p-nitrobenzyl)ammonium bromide.

10. 4-m-propoxyphenylcarbamylmethyl)-4-(4-nitrobenzyl)morpholinium bromide.

11. 1-(m - propoxyphenylcarbamylmethyl)- 1 -(4-nitrobenzyl)-piperidinium bromide.

12. (m - Benzyloxphenylcarbamylmethyl) dipropyl (p-chlorobenzyl)ammonium bromide.

References Cited in the file of this patent

UNITED STATES PATENTS

| 2,139,190 | Iselin et al. | Dec. 6, 1938 |
| 2,317,999 | Leuchs | May 4, 1943 |
| 2,325,331 | Martin et al. | July 27, 1943 |
| 2,343,071 | Martin et al. | Feb. 29, 1944 |
| 2,414,050 | Linch | Jan. 7, 1947 |

OTHER REFERENCES

Renshaw et al.: J. Biol. Chem., vol. 103, pp. 183–6 (1933).
Hunt et al.: Chem. Abst., vol. 23, p. 3023 (1929).
Geigy: Chem. Abst., vol. 34, p. 8117 (1940).
Simons: Ind. and Eng. Chem., vol. 39, p. 238 (1947).